UNITED STATES PATENT OFFICE.

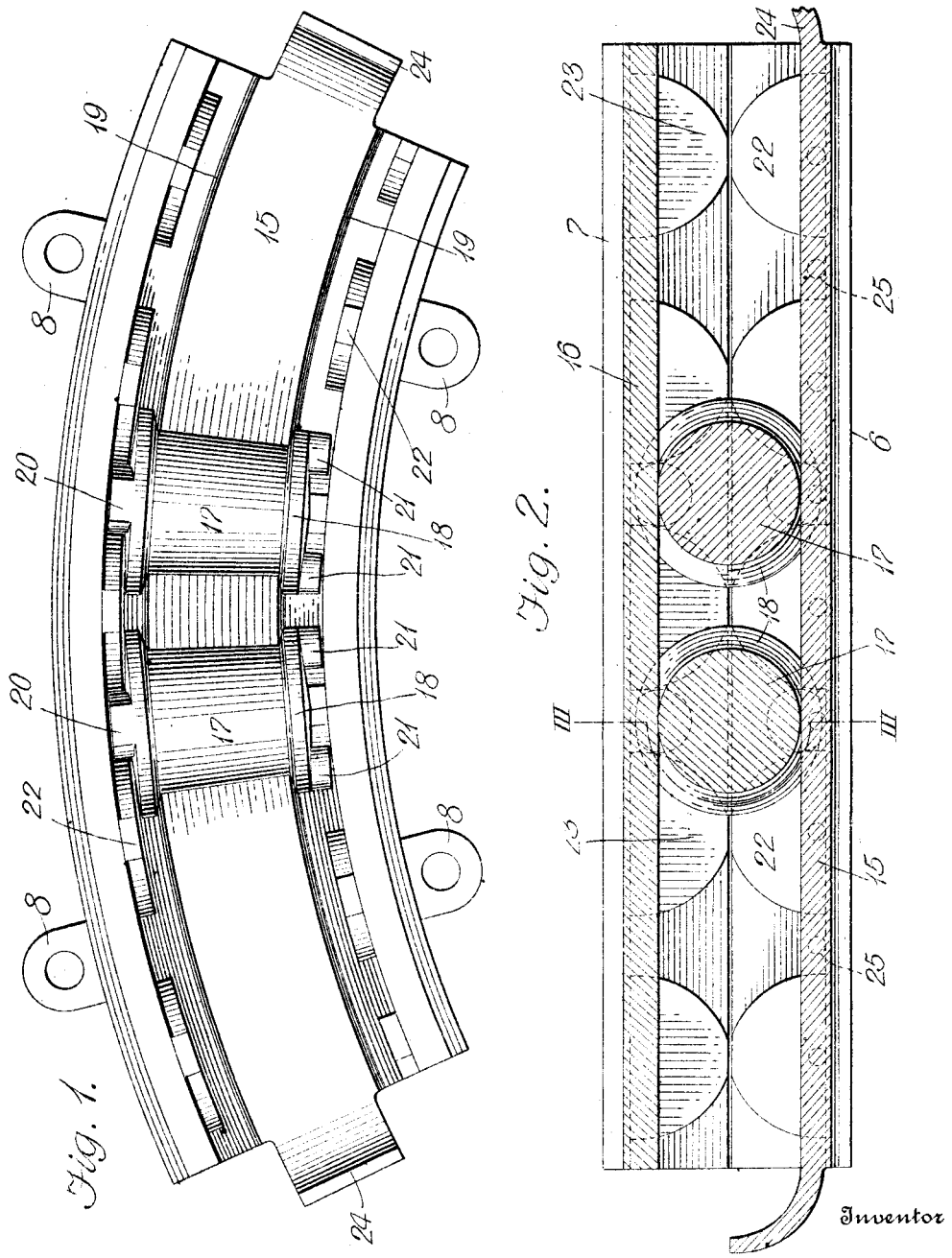

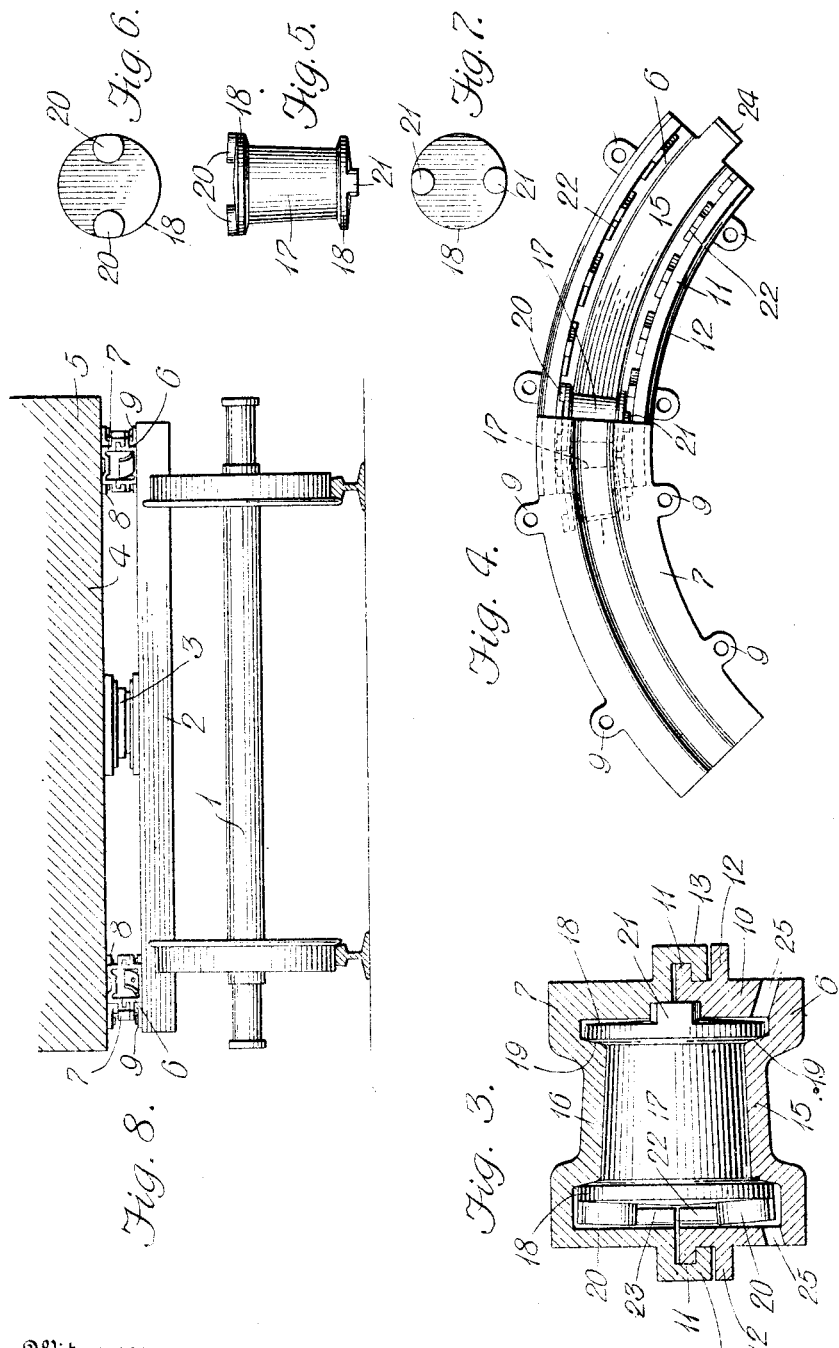

FRANCIS G. SUSEMIHL, OF DETROIT, MICHIGAN.

CAR SIDE BEARING.

1,132,749.  Specification of Letters Patent.  Patented Mar. 23, 1915.

Application filed February 24, 1914. Serial No. 820,509.

*To all whom it may concern:*

Be it known that I, FRANCIS G. SUSEMIHL, a citizen of the United States of America, residing at Detroit, in the county of Wayne and State of Michigan, have invented certain new and useful Improvements in Car Side Bearings, of which the following is a specification, reference being had therein to the accompanying drawings.

This invention relates to bearings for rolling stock, and more particularly to that type of side bearings used in connection with electric and steam railway cars for limiting the tilting or rocking movement of a car body relatively to its trucks, limiting the turning or swivel movement of a truck and for otherwise insuring the stability of a car body when moving over a curved section of track.

It has been a common practice to utilize cages or frames containing rollers and to control the movement of the same by swivel blocks and controlling bars. Such devices are limited in their action, cumbersome, expensive to manufacture, difficult to properly install and susceptible to considerable wear. In designing my improved side bearing, I have aimed to eliminate the above defects by a sectional housing containing rollers and means whereby the rollers can be moved in spaced and timed relation, without any danger of sliding, accidental displacement, or undue wear from the accumulation of foreign matter within the housing.

Each bearing consists of comparatively few parts that can be completely assembled at a factory, safely transported, and installed in such a manner as not to interfere with the removal of a car body from its trucks.

The above and other results are obtained by a mechanical construction that will be hereinafter specifically described and then claimed, and reference will now be had to the drawings, wherein—

Figure 1 is a plan of a bearing with the top or upper section thereof removed; Fig. 2 is a longitudinal sectional view of the bearing; Fig. 3 is a cross sectional view of the same taken on or about line III—III of Fig. 2; Fig. 4 is a plan of a bearing illustrating one section thereof shifted relatively to the other; Fig. 5 is a plan of a detached roller; Fig. 6 is a view of one end thereof; Fig. 7 is a view of the opposite end of the roller, and, Fig. 8 is a front elevation of a portion of a truck and car body illustrating side bearings in accordance with this invention.

In describing my invention by aid of the views above referred to, I desire to point out that I intend the same as merely illustrative of an example whereby my invention may be applied in practice, and I do not limit the invention to the precise arrangement and construction of parts shown. The following description is therefore to be broadly construed as including substitute arrangements and constructions which are the obvious equivalent of those shown.

As an instance of the use of the bearing there is illustrated in Fig. 8 a truck 1 having a bolster 2 and connected to said bolster by a swivel 3 or other pivotal means is the transom 4 of a car body 5, and arranged between the ends of the bolster and the transom are bearings that assist in supporting the car body relatively to the truck.

Each bearing comprises a housing that is segment-shaped in plan, the length of the housing depending upon the movement of the truck relatively to the car body and the curvature of the housing depending upon its location and distance from the swivel 3. The housing has two channel-shaped sections 6 and 7, one inverted relatively to the other, the section 6 having apertured lugs 9 whereby it can be conveniently secured to the bolster 2 and the section 7 having apertured lugs 8 whereby it can be conveniently connected to the transom 4 of the car body 5.

The bolster section 6 has the vertical walls 10 thereof provided with oppositely extending lateral parallel flanges 11 and 12, the latter being of a greater width than the former. Slidably arranged between the flanges 11 and 12 are the depending angular flanges 13 of the transom section 7, said flanges being carried by the lower edges of the vertical walls 14 of said section and serving three purposes in connection with the bearing. First, the flanges 13 prevent vertical displacement of the transom section relatively to the bolster section; second, the manner in which the flanges are interlocked precludes any possibility of dirt, grit and foreign matter interfering with the movement of the transom section relatively to the bolster section, and third, the flanges 12 serve functionally as rails upon which the flanges 13 can slide should the rollers arranged between the sections fail to perform their function.

The sections 6 and 7 are provided with longitudinal depressed portions forming confronting rails 15 and 16 within the housing, said rails being of a less width than the sections 6 and 7 and having the confronting faces or treads thereof disposed at an inclination relatively to the walls of the housing, the angle of each rail being co-incident to a radial line having for its center the swivel 3.

Arranged in the housing and having a rolling contact with the rails 15 and 16 are spaced conical rollers 17, said rollers having the ends thereof provided with peripheral flanges or heads 18 that are braced relatively to the body of each roller by fillets 19, which engage the sides of the rails 15 and 16 and prevent a lateral movement of the rolls relatively to the track formed by the rails 15 and 16. The outer sides of the flanges or heads 18 are convex and are provided with diametrically opposed trunnions 20 and 21 disposed at the peripheral edges of said flanges or heads. The trunnions 20 on the outer ends of the rollers are disposed at right angles to the trunnions upon the inner ends thereof and as best shown in Figs. 5, 6 and 7, all of the trunnions would ordinarily protrude beyond the peripheries of the flanges or heads, but such projection is eliminated by removing the excessive material. When the trunnions set inward from the periphery of each flange or head the path or curve described by the trunnions of the rollers will represent a prolate cycloid, and when the trunnions are set beyond the peripheries of the flanges or heads the path or circle described by the trunnions is a curtate cycloid, but in practice, it is preferable that the trunnions have a true cycloidal movement, as will hereinafter appear.

The inner sides of the walls 10 and 14, of the housing are provided with equally spaced integral cams or arcuated members 22 and 23, the members of the bolster section 6 serving functionally as guides for the rollers and the members of the transom section 7 serving functionally as a driven element for the rolls, and all of said members coöperate whereby the rollers 17 are moved in spaced and timed relation. The cams or members of the inner walls 10 and 14 are alternately disposed relatively to the cams or members of the outer walls and the spaces or interstices provide clearance for the trunnions, whereby said trunnions can alternately ride into engagement with the cams of the bolster section 6 and the cams of the transom section 7. When the trunnions 20 at the outer end of a roller are riding upon the cams or members 22 the trunnions 21 at the inner end of the roller are located in the spaces between the cams or members 23, and after the rollers 17 have been properly positioned in the housing it is impossible for said rollers to become accidentally displaced relatively to each other. It is in this connection, that the ends of the rail 15 of the bolster section 6 are extended and bent upwardly to form lips 24, serving as stops to limit the movement of the rollers to preclude any possibility of becoming disarranged during shipment.

The bolster section has the side walls 10 thereof provided with lateral openings 25 whereby water and other matter is prevented from accumulating in the housing and interfering with the rolling action of the rollers.

From the foregoing it will be observed that I have devised a novel bearing embodying sections or members movable one upon the other and spaced apart by rollers that move in unison by virtue of means within the bearing shifting the rollers in spaced relation and in practice, the rollers are normally retained intermediate the ends of the housing but can freely move when a truck assumes an angle relatively to a car body. It is in this connection that a single roller can be used in connection with the bearing of a street car, and in either instance, the taper of the roller prevents the same from twisting or laterally shifting during its rolling action upon the angularly disposed treads or faces of the rails.

The principal involved in this invention is applicable to bearings used in connection with turn-tables and revolving or swinging structures.

What I claim is:—

1. A bearing of the type described comprising a bolster section, a transom section, rollers interposed between said sections, and means carried by the ends of said rollers and engaging the side walls of said sections, and approximately attingent cams carried by the walls of said sections for maintaining said rollers in spaced relation during a movement thereof.

2. A bearing of the type described comprising a bolster section, a transom section, flanged rollers interposed between said sections, means carried by the ends of said rollers and engaging the side walls of said sections, means carried by side walls of said sections for moving and maintaining said rollers in spaced relation, and means in connection with said sections for preventing said transom section from becoming vertically displaced relatively to said bolster section.

3. A bearing of the type described comprising a bolster section, a transom section movably connected to said bolster section, confronting rails carried by said sections, flanged rollers engaging said rails, and projections carried by the ends of said rollers and approximately attingent cams at the sides of said sections adapted to move said projections in cycloidal courses for maintaining said rollers in spaced relation.

4. A bearing comprising connected sections capable of shifting longitudinally of one another, confronting rails carried thereby, flanged rollers movable upon said rails, cams carried by the inner sides of said sections with the cams at one side alternating with the cams on the other side and means carried by the ends of said rollers and guided in a cycloidal course by said cams for maintaining said rollers in spaced relation.

5. A bearing of the type described comprising bolster and transom sections, confronting rails carried by said sections, flanged rollers movable between said rails, projections carried by the ends of said rollers with the projections at one end disposed in a plane at an angle to the projections at the opposite end, and cam members carried by said sections and adapted to be engaged by the projections of said rollers whereby said rollers are maintained in spaced relation throughout a movement thereof between said rails.

6. A bearing of the type described comprising a channel shaped bolster section, a channel-shaped transom section having connection with said bolster section and movable longitudinally thereof, confronting rails carried by said sections, flanged rollers movable between said rails, projections carried by the flanged ends of said rollers, means carried by said sections and alternately engaged by said projections for maintaining said rollers in spaced relation throughout a movement thereof between said rails, and means in connection with one of said sections for preventing said rollers from becoming accidentally displaced relatively to said sections.

7. A bearing comprising relatively movable sections, independent rollers between the sections, cams at the ends of said rollers, and projections on the ends of said rollers constantly in contact with said cams and guided in a cycloidal course by said cams for maintaining said rollers in spaced relation.

In testimony whereof I affix my signature in presence of two witnesses.

FRANCIS G. SUSEMIHL.

Witnesses:
 LEWIS E. FLANDERS,
 ANNA M. DORR.